US008150878B1

(12) United States Patent
Aizen et al.

(10) Patent No.: US 8,150,878 B1
(45) Date of Patent: Apr. 3, 2012

(54) DEVICE METHOD AND COMPUTER PROGRAM PRODUCT FOR SHARING WEB FEEDS

(75) Inventors: Jonathan Aizen, San Francisco, CA (US); Eran Shir, Kfar Saba (IL); Jacob P. Ukelson, Tel Aviv (IL)

(73) Assignee: Yahoo! Inc., Sunnyvale, CA (US)

( * ) Notice: Subject to any disclaimer, the term of this patent is extended or adjusted under 35 U.S.C. 154(b) by 217 days.

(21) Appl. No.: 11/940,387

(22) Filed: Nov. 15, 2007

Related U.S. Application Data (60) Provisional application No. 60/901,115, filed on Feb. 14, 2007.

(51) Int. Cl.
*G06F 17/00* (2006.01)
(52) U.S. Cl. ......... 707/791; 707/802; 707/822; 707/828
(58) Field of Classification Search .................. None
See application file for complete search history.

(56) References Cited

U.S. PATENT DOCUMENTS

| | | | |
|---|---|---|---|
| 2002/0111966 A1 | 8/2002 | Fukuda et al. | 707/513 |
| 2006/0287989 A1 | 12/2006 | Glance | 707/3 |
| 2007/0050175 A1 | 3/2007 | Schmelzer et al. | 702/186 |
| 2007/0225047 A1* | 9/2007 | Bakos | 455/566 |
| 2007/0239674 A1* | 10/2007 | Gorzela | 707/3 |
| 2007/0250577 A1 | 10/2007 | Veeramachaneni et al. | 709/206 |
| 2008/0034058 A1* | 2/2008 | Korman et al. | 709/217 |
| 2008/0046543 A1* | 2/2008 | Chasen et al. | 709/219 |

* cited by examiner

*Primary Examiner* — Isaac M Woo
(74) *Attorney, Agent, or Firm* — Brinks Hofer Gilson & Lione (57) ABSTRACT

A system for generating a feed, the system including: a memory unit adapted to store a web feed repository; and a processor, adapted to search for a web feed set that includes at least one web feed that is related to the web site or to a first web feed promoted when browsing to the web site; wherein the system enables a subscription to at least web feed of the web feed set.

3 Claims, 7 Drawing Sheets

Change similarity detection 502

Isolate 503

Select 504

Select inside 506

Web page area 510

Feed preview area 550

Selected elements area 520

Fields area 525

Groups area 530

DEVICE METHOD AND COMPUTER PROGRAM PRODUCT FOR SHARING WEB FEEDS

RELATED APPLICATIONS

The present invention claims the priority of U.S. provisional patent filing date Feb. 14, 2007 and Ser. No. 60/901,115 which is incorporated herein by reference.

FIELD OF THE INVENTION

The present invention relates to a method, a device and a computer program product for sharing web feeds.

BACKGROUND OF THE INVENTION

Web feeds (also referred to as feeds or channels) are data formats used for serving users frequently updated content. A web feed can include multiple items. U.S. patent application serial number 2006/0288329 of Gandhi et al., which is incorporated herein by reference, illustrates a content syndication platform.

Content distributors syndicate a web feed, thereby allowing users to subscribe to it, accordingly only content that is included in a predefined (so-called promoted) web feed can be syndicated. The promoted web feed is being promoted when the user browses to the web site (or to a web page of that web site). Content distributors sometimes also define a programmatic interface to their content (also known as an API), which allows programmatic access to the content.

There is a growing need to expose users to multiple web feeds and especially to web feeds that are related but differ from the promoted web feed.

SUMMARY OF THE PRESENT INVENTION

A method for sharing a web feed, the method includes: receiving a user request that is related to a web feed that is associated with a web site; searching for a web feed set that comprises at least one web feed that is related to the web site or to a first web feed promoted when browsing to the web site; and enabling a subscription to at least web feed of the web feed set.

A computer program product having a computer readable medium usable with a programmable computer, the computer program product having computer-readable code embodied therein for receiving a user request that is related to a web feed that is associated with a web site; searching for a web feed set that comprises at least one web feed that is related to the web site or to a first web feed promoted when browsing to the web site; and enabling a subscription to at least web feed of the web feed set.

A system for generating a feed, the system includes: a memory unit adapted to store a web feed repository; and a processor, adapted to search for a web feed set that includes at least one web feed that is related to the web site or to a first web feed promoted when browsing to the web site; and enable a subscription to at least web feed of the web feed set.

BRIEF DESCRIPTION OF THE DRAWINGS

The present invention will be understood and appreciated more fully from the following detailed 4 description taken in conjunction with the drawings in which.

DETAILED DESCRIPTION OF THE DRAWINGS

The term "feed" as used herein below refers to preconfigured feeds such as RSS feeds, and dynamic feeds that require input before providing the feed also known as APIs. A web feed is associated with a web site if it is associated with any one of the pages of that web site.

The term "promoted web feed" as used herein refers to a predefined web feed that is promoted when browsing to a browsed web site (or a browsed web page). The promoted web feed is defined by the content distributors.

A method, computer program product and system are provided for sharing web feeds. Conveniently, a set of one or more web feeds that differ from the promoted web feed (if such exists) are made accessible to a user, thus enabling the user to subscribe to one or more web feeds of the set. The web feed set includes one or more web feeds that are related to a web page (or a web site) and, additionally or alternatively, one or more web feeds that are related to a promoted web feed (if such exists).

Conveniently, a web feed can belong to the set if at least one of the following conditions occur: (i) the web feed is associated with the browsed web site or with the browsed web page (the associated can be determined by the web site and web feed URLs), (ii) the web feed has a topic that is similar (or identical) to the topic of the promoted web feed, (iii) the web feed has a topic that is similar (or identical) to the topic of the browsed web site (or browsed web page), (iv) the web feed has at least one meta data descriptor that describes a structural element that matches or is similar to promoted web feed.

Conveniently, the search can be conducted without browsing to another web site. But, if a user wishes to define a new web feed (or to update an existing web feed) then that user will be required to browse to a primary web site.

Figure 1:
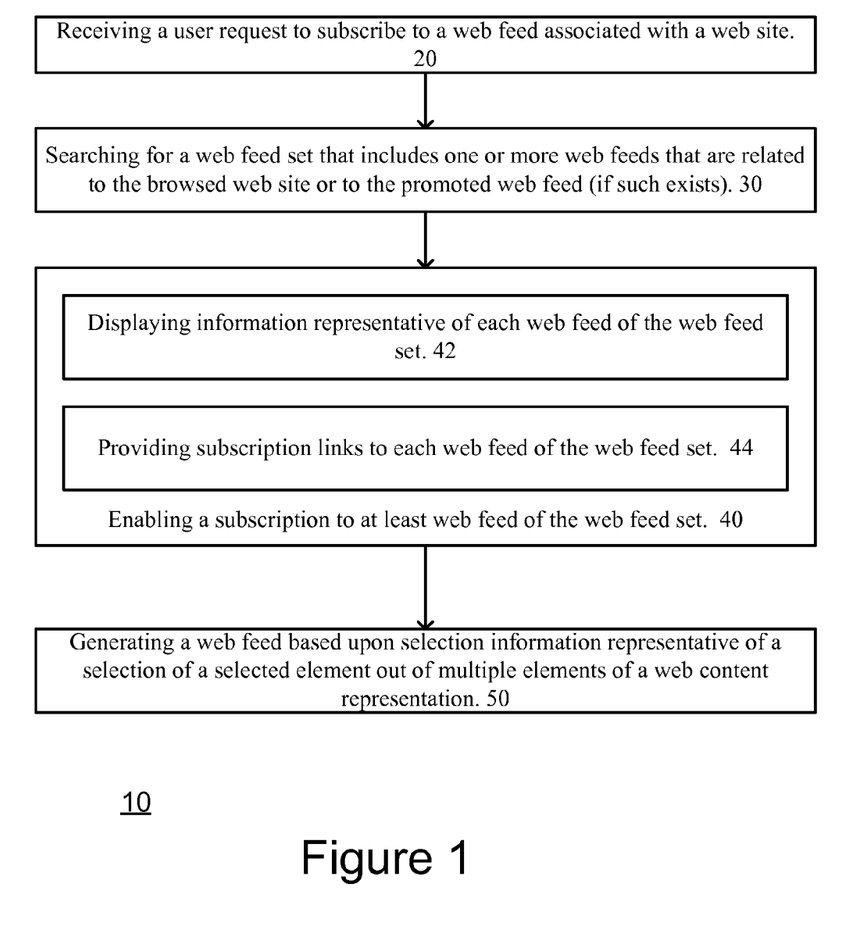
FIG. 1 illustrates a method for sharing a web feed, according to an embodiment of the invention.

FIG. 1 illustrates method 10 for sharing a web feed according to an embodiment of the invention.

Method 10 starts by stage 20 of receiving a user request that is related to a web feed that is associated with a web site. A web feed can be associated with a web site if it is associated with one or more pages of that web site. The user request can be, for example, a request to subscribe to the web feed, a request to view the web feed, and the like.

The request can be received after the user browses to the web site and receives an indication (usually an icon) that a predefined web feed (a promoted web feed) exists. The user can then send a request that is related to the promoted web feed.

Additionally or alternatively, the request can be received after the user receives a shared indication that invites the user to initiate a search for one or more web feeds that can be related to a browsed web site (or to a promoted web feed—if such exists), although these one or more web feeds are not promoted when the user browses to the web site. It is noted that the shared indication can be displayed regardless of whether a promoted web feed exists.

Stage 20 is followed by stage 30 of searching for a web feed set that includes one or more web feeds that are related to the browsed web site or to the promoted web feed (if such exists).

Stage 30 can include searching one or more web feed repositories. Each web feed repository can include information that describes web feeds. This information can include one or more URLs of a web site and/or a web page associated with the web feed, a title of each web feed, a list of one or more structural elements included within each web feed, and the like. The structural elements can be extracted from a representation of the web site or the web page. One or more structural element can be selected by a user to be included in the web feed. Methods and devices for generating a web feed that includes structural elements are described in appendix A of this patent application.

It is noted that a web feed repository can store web feeds that were defined by other users (than the user than sent the request during stage 20).

Stage 30 can include at least one of the following or a combination thereof: (i) searching for a web feed set that includes at least one web feed that was defined by another user; (ii) searching for a web feed set that includes a web feed that is associated with a certain page of the web site; wherein the first web feed is associated with another page of the web site; (iii) searching for a web feed that has a similar topic to a topic of the first web feed; or (iv) searching for a web feed with at least one similar meta-data descriptor describing a structural element shared with the first web feed.

Stage 30 is followed by stage 40 of enabling a subscription to at least web feed of the web feed set.

Stage 40 conveniently includes stage 42 of displaying information representative of each web feed of the web feed set and stage 44 of providing subscription links to each web feed of the web feed set.

It is noted that if a user generated a request related to one of the web feeds in the web feed set (especially in response to the displayed information of stage 42) then stages 30-40 can be repeated. Additionally or alternatively, once a request relating to a web feed is provided the web site (or web page within the web site) that is associated to this web feed can also be displayed.

Accordingly, the user can browse between web sites by selecting one web feed after the other.

Figure 5:
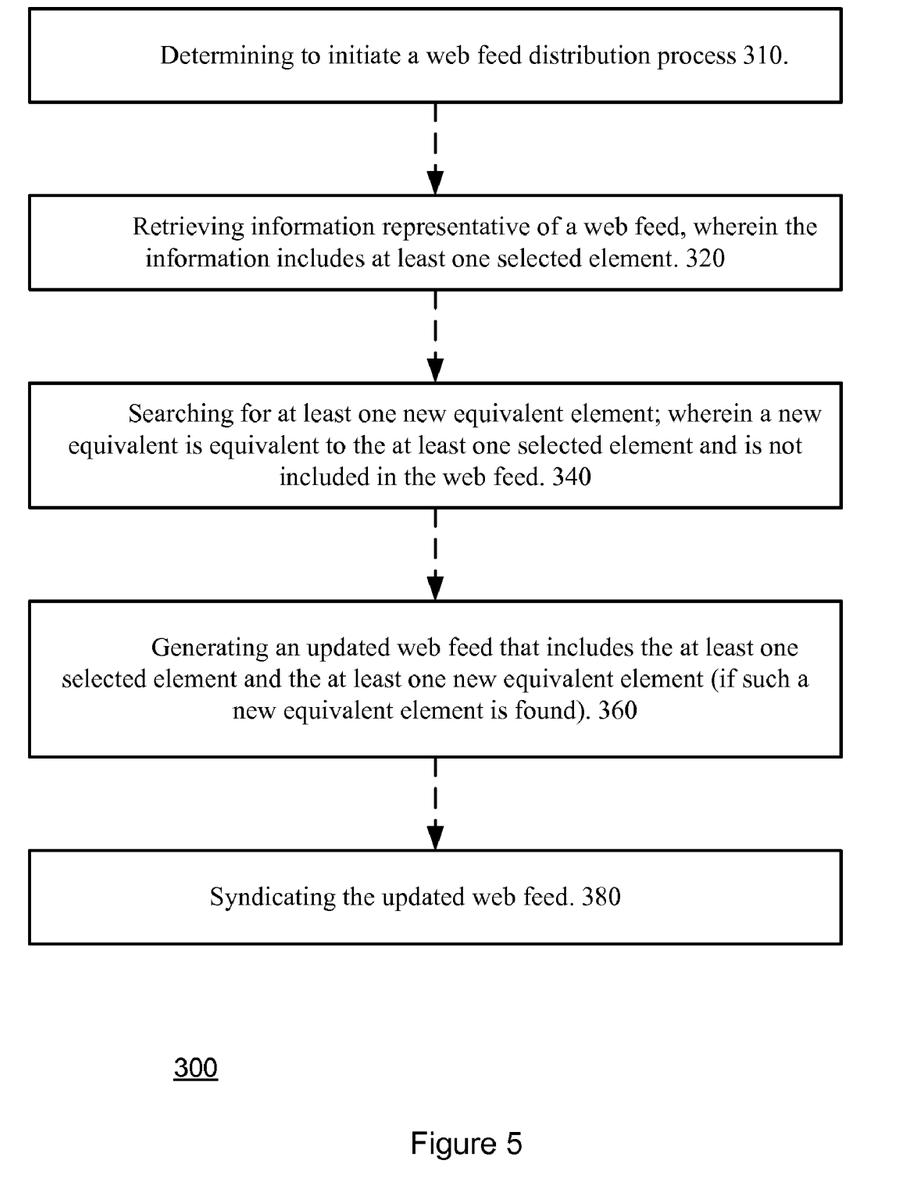
FIG. 5 illustrates a method for distributing a web feed.

According to an embodiment of the invention method 10 further includes stage 50 of generating a web feed based upon selection information representative of a selection of a selected element out of multiple elements of a web content representation. Stage can include various stages of method 100, as illustrated in FIG. 5 of Appendix A.

Stage 50 can be used to generate a new web feed, after previously presented web feeds (promoted web feed, web feeds stored in the web feed repository) do not satisfy the user.

Stage 50 can include asking the user to browse to a primary website that differs from the browsed web site to which the user browsed before executing stage 20.

Figure 2:
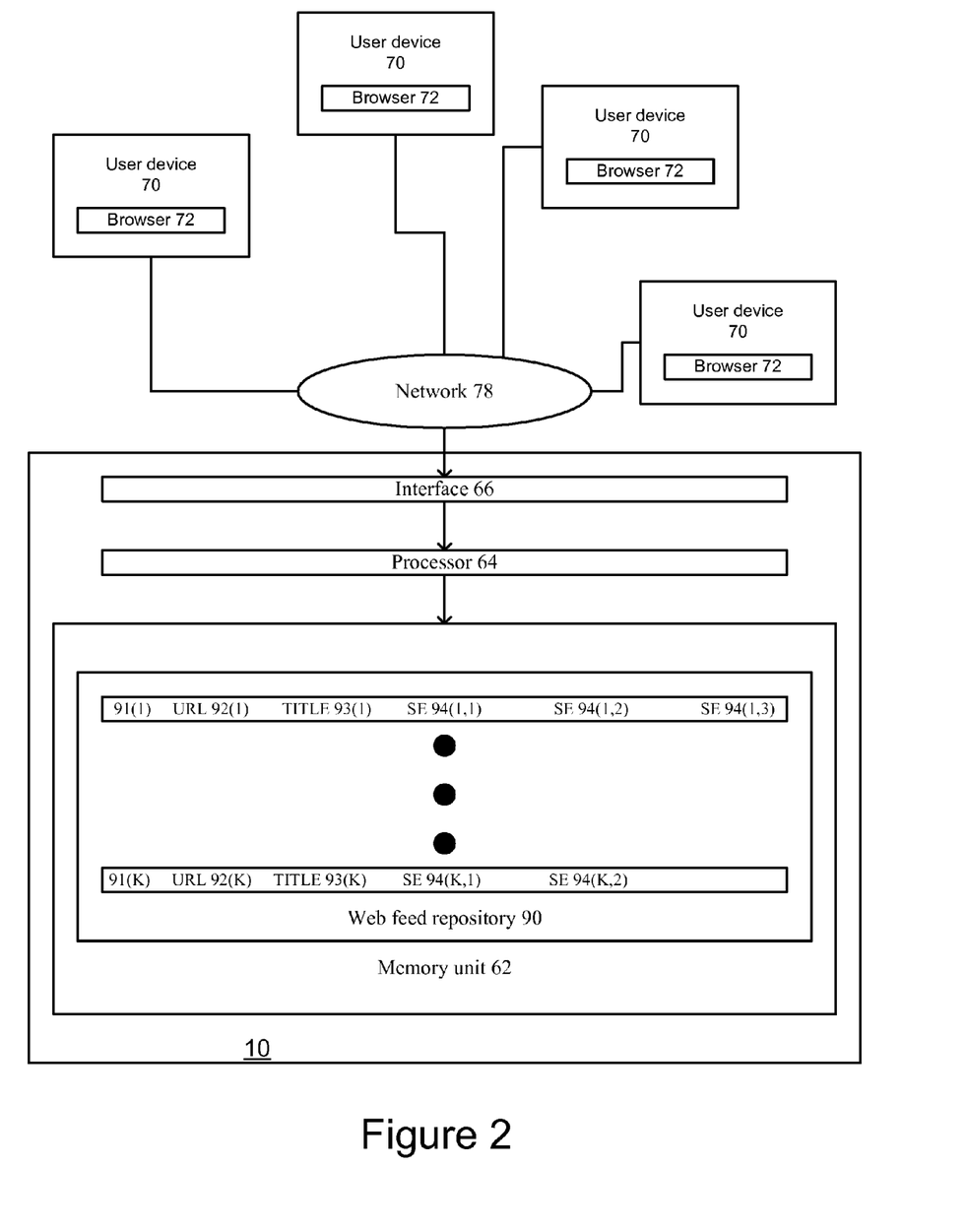
FIG. 2 illustrates a system according to an embodiment of the invention.

FIG. 2 illustrates system 60 according to an embodiment of the invention.

System 60 includes memory unit 62, processor 64 and interface 66.

System 60 is connected to user devices 70 via one or more networks such as but not limited to network 78.

User devices 70 are equipped with browsers 72. These browsers are adapted to send system 60 (via interface 66) requests to subscribe to a web feed. The request can be temporarily stored in memory unit 62 and then sent to processor 64. Processor 64 can execute a search code (represented by web feed search module 68) in order to locate web feeds that are associated with the web site or with a promoted web feed.

Memory unit 62 stores one or more web page repositories such as web page repository 90. Web feed repository 90 includes information such as one or more URLs of a web site and/or a web page associated with the web feed, a title of each web feed, a list of one or more structural elements included within each web feed, meta-data describing that structural element and the like. The structural elements can be extracted from a representation of the web site or the web page. One or more structural element can be selected by a user to be included in the web feed. For example, web feed repository 90 includes information relating to web feeds 91(1) till 92(K). Index K being a positive integer. Web feed 91(1) is described by its URL (denoted "URL 92(1)), by its title (denoted "TITLE 93(1)), and by few structural elements (denoted "SE 94(1,1)", "SE 94(1,2)" and "SE 94(1,3)"). Web feed 91(K) is described by its URL (denoted "URL 92(K)), by its title (denoted "TITLE 93(K)), and by few structural elements (denoted "SE1 94(K,1)" and "SE 94(K,2)").

Figure 6:
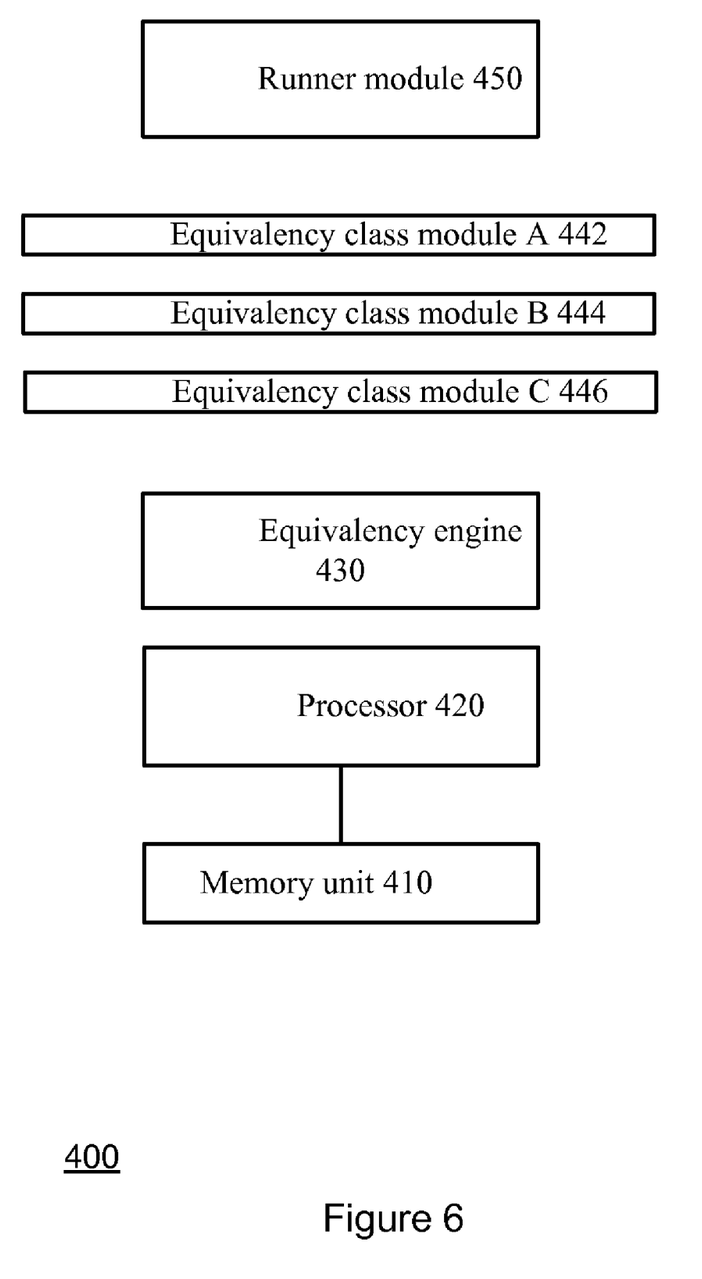
FIG. 6 illustrates a system for generating and distributing web feeds.

It is noted that system 60 can be connected to system 400 of FIG. 6 or can share some components with system 400 but this is not necessarily so.

Figure 3:
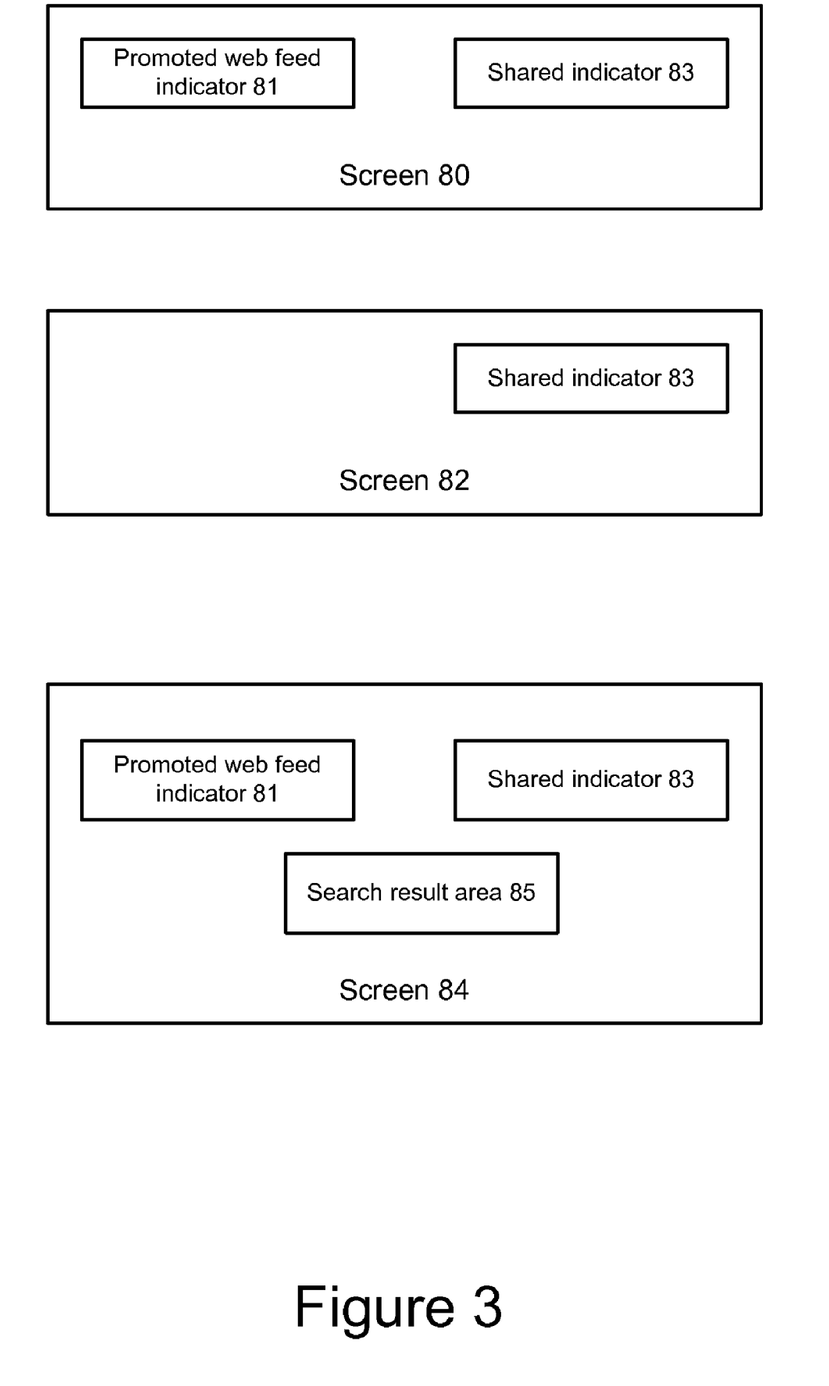
FIG. 3 illustrates various screens displayed to a user, according to an embodiment of the invention.

FIG. 3 illustrates screens 80, 82 and 84 that are displayed to a user, according to various embodiments of the invention.

Screen 80 includes promoted web feed indicator 81 and a shared indicator 83. Screen 82 includes shared indicator 83 while not including a promoted web feed indicator 81. Screen 84 includes search result area 95 in which a search result is displayed. The search result indicates which web feeds (if any) are included in the web feed set.

Both web feed indicator 81 and shared indicator 83 can be displayed regardless of a request of a user to subscribe to the promoted web feed. For example, promoted web feed indicator 81 can be displayed before shared indicator 83. Yet for another example, shared indicator can be displayed only after the user initiated a subscription (to the promoted web feed) process, but this is not necessarily so.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Accordingly, a computer program product is provided. The computer program product includes a computer readable medium usable with a programmable computer, the computer program product having computer-readable code embodied therein for receiving a user request that is related to a web feed that is associated with a web site; searching for a web feed set that comprises at least one web feed that is related to the web site or to a first web feed promoted when browsing to the web site; and enabling a subscription to at least web feed of the web feed set.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

APPENDIX A

Figure 4:
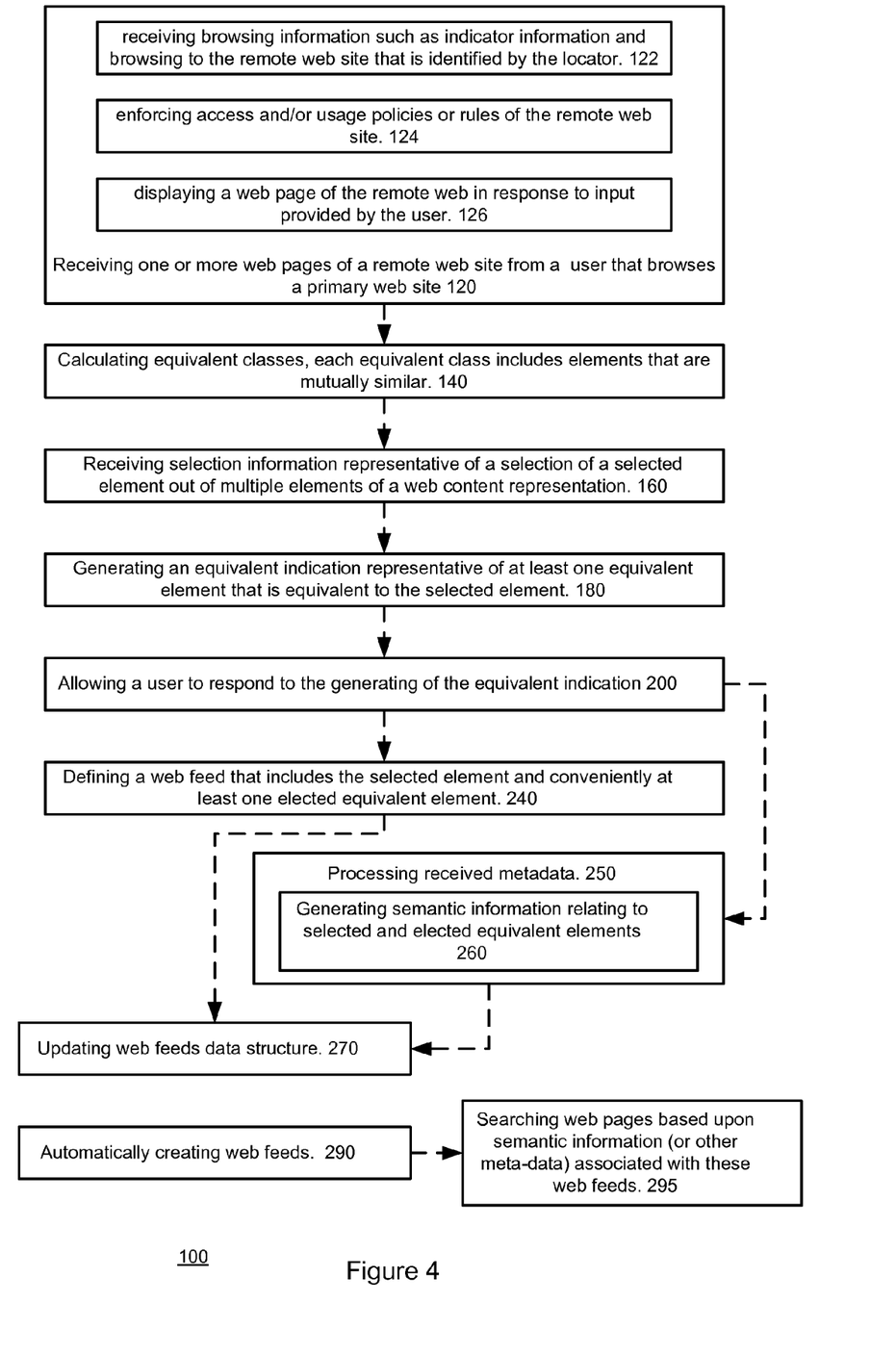
FIG. 4 illustrates a method for generating a web feed.

FIG. 4 illustrates method 100 for generating a web feed.

Method 100 starts by stage 110 of displaying a graphical interface to a user that browses to a primary website. Such a web site can be www.dapper.org, but this is not necessarily so.

Conveniently the graphical interface includes a window for inserting a remote web page locator such as a Uniform Resource Locator. The graphical interface also includes various mechanisms to allow a user to browse in order to find the appropriate page.

Stage 110 is followed by stage 120 of receiving one or more web pages of a remote web site from a user that browses to the primary web site. The web pages can be received one at a time, after being selected by the user. The selection utilizes the graphical interface.

Stage 120 can include: (i) stage 122 of receiving browsing information such as indicator information and browsing to the remote web site that is identified by the locator, (ii) stage 124 of enforcing access and/or usage policies or rules of the remote web site, (iii) stage 126 of displaying a web page of the remote web in response to input provided by the user, and the like.

It is noted that stage 124 of enforcing can include preventing a user to access the remote web site, preventing the user from accessing a certain web page of the remote web site, preventing the user from downloading certain content, conditioning the access to content or retrieval of content, and the like. The conditioning can include limiting the number of accesses of the user per time period, require the user to pass one or more tests (such as inserting text representative of a wrapped image), can require the user to pay for access of for certain information, and the like. In this sense the primary web site enables the remote web site to enforce its access and/or usage policies.

It is noted that these access and/or usage policies can be applied each time the remote web site is accesses or content is retrieved during a distribution of a web feed that includes content from that remote web site.

Stage 120 can involve multiple repetitions of either one of stage 122-126 such as to provide one or more web pages for analysis.

Stage 120 is followed by stage 140 of calculating equivalent classes, each equivalent class includes web content representation elements that are mutually equivalent.

Conveniently stage 140 includes calculating equivalent classes by an equivalency engine (also referred to as equivalency engine or core engine). At the end of stage 120 the equivalency engine can receive one or more sample web pages or URLs that form a sample set. The sample set can be of any size, from a single page upwards.

According to various embodiments of the invention if the sample set includes multiple web pages than the equivalency engine can differentiate between static elements (static content) and the dynamic elements (dynamic content) within the sample set. The differentiating can include ignoring dynamic elements. Static content is defined as content that repeats on any or many of the samples while dynamic content includes content that changes from page to page. For example, if three samples of different search results from a search engine will all consider the logo of the search engine to be static content, but will contain different results, unique to each page, which will be considered dynamic.

According to various embodiments of the invention stage 140 can include at least one of the following or a combination thereof: (i) calculating at least one key for each element; (ii) storing the at least one key per element; (iii) calculating multiple keys of different abstraction level per element; (iv) choosing to store a subset of the associated keys, thus defining the strictness and looseness of the field definition; (v) calculating equivalent classes in response to structural characteristics of the elements; (vi) determining an equivalency of a first element and a second element in response to a characteristic of equivalent elements of the first element and a characteristic of the second element; (vii) calculating equivalent classes in response to previous elections of the user; (viii) calculating equivalent classes in response to elections of another user; (ix) calculating equivalent classes in response to an indication representative of an equivalency level of an equivalency class; (x) calculating equivalent classes in response to an indication representative of a scope of a search for equivalent element.

Conveniently stage 140 the calculating of equivalency classes includes linking elements in a web content representation (such as in a document object module (DOM) representation of a web page or another semi-structured web format such as but not limited to RSS). Equivalence can be defined as structural equivalence and can be defined by one or more different heuristics.

Conveniently, keys generated during stage 120 allow for easy identification of classes of web page sub-trees that have equivalent structure. The keys can be assigned based upon key definitions that can be updated over time. These keys are conveniently robust to changes on a page.

A sample equivalence class describes the "Most Complex Structure" (MCS) within a DOM representation of a web page which is the oldest (closest to the root of the DOM) but has a similar static sub-tree structure.

The MCS computation algorithm can use examples to differentiate between static and dynamic elements in a page (static elements do not change for different instances of a page, while dynamic elements can change for each instance of a page). For example if a user searched for the term "dapper" on Google™ (thus the web site www.google.com is the remote web site then the search result will include multiple web pages that have a similar structure (simplified for illustration purposes): (i) Title—Bolded version of the search term; (ii) Description—Bolded version of the search term, URL, Size, "Cached: link, "Similar pages" link, "Note this" link, "More results" link. It is noted that dynamic elements are in italics. They do not show up for every repeating structure.

Conveniently, stage 120 includes calculates keys that describe the element and its relative structure within the DOM. These keys are used to calculate similarity between different structures. Different types of keys can be used in order to compute different types of equivalences (or similarity)

A key is computed for each element which describes a structural characteristic of the element. An element with multiple children that have the same key, defines a Most Complex Structure (MCS) which is the oldest (closest to the root of the DOM) but has a similar static sub-tree structure. For elements that have no such MCS the root tag (HTML) is considered the MCS ancestor. Each MCS defines an MCS element key which defines it as an MCS, and allows elements to easily be linked to their MCS ancestor.

Conveniently, stage 120 includes generating an internal element key for each element. This internal key element includes multiple attributes such as: (i) HTML tag, (ii) static content of the element (where applicable); (iii) MCS ancestor (where applicable); and (iv) relative offset from the MCS ancestor (using a DFS numbering scheme—where applicable).

Conveniently, stage 120 includes generating a cousin key for each element. The cousin key includes: (i) a tag, (ii) an MCS Tag, (iii) an MCS Key, (iv) an absolute level (from the root of the tree), and (v) relative level from MCS ancestor.

Conveniently stage 120 further includes generating easily retrievable data structures representative of the equivalency classes. Samples of easily retrievable data structures can include: (i) a first list of all of an elements descendant tags; (ii) a second list that includes an element's level, tag_name, EKMC.

Stage 120 conveniently includes a heuristic determining that two elements are equivalent if a ratio between the number of unique first list elements (that exist in only in one MCS) and the number of first list elements in their union is less than some constant.

Stage 120 can assign a unique key per each table element, another key per each table row, a further key per each table column and yet a further key for all the cells of the table.

Yet according to another embodiment of the invention stage 140 can include utilizing one or more equivalency class that was calculated in the past. These equivalency classes can be calculated in relation to one or other users, can be responsive to inputs of one or more other users and the like. Thus, instead of calculating new equivalency classes stage 120 can involve utilizing previously calculated equivalency classes.

Stage 140 is followed by stage 160 of receiving selection information representative of a selection of an element out of multiple elements of a web content representation. The selection can be made by simply clicking on a selected element of a web page of a remote web site that is being displayed to the user.

Stage 160 is followed by stage 180 of generating an equivalent indication representative of at least one equivalent element that is similar to the selected element.

Stage 180 can include emphasizing equivalent elements of the displayed web page. The emphasis can include highlighting equivalent elements, surrounding these equivalent elements by a frame, or utilizing any known graphical technique.

Stage 180 is followed by stage 200 allowing a user to respond to the generation of the equivalent indication. The user can perform at least one of the following or a combination thereof: (i) elect at least one equivalent element and optionally define its associated meta-data and/or semantic information; (ii) de-elect at least one equivalent element; (iii) de-select the selected element; (iv) elect a non-equivalent element; (v) change at least one characteristic of the similarity algorithm.

It is noted that multiple iterations of stage 180 can occur and the user can provide an end of stage indication before method 100 continues to stage 240.

It is further noted that the response of the user can cause method 100 to try to find a minimal equivalency class such as to include only the selected element and the equivalent elements that were selected (or not de-selected) by the user.

Stage 200 can include waiting for a certain period (that can be time limited) but this is not necessarily so. The user can receive reminders that urge him to either perform one or more of the mentioned above operations) or to terminate the election stage. It is noted that the user can perform multiple elections.

Stage 200 is followed by stage 240 of defining a web feed. The web feed will include a selected element and can include one or more equivalent elements. The one or more equivalent elements can be selected by the user (either by positively electing the equivalent element or by merely not de-selecting an equivalent element).

Conveniently, the generation of a web feed also involves receiving and processing metadata such as but not limited to semantic content. The metadata can include linking information that links between selected items, a user definition of one or more selected items, and the like.

For example, a user can define hierarchies by creating a group of elements. This definition is received during stage 200. The user can choose (and the method receives) any combination of elements and previously defined groups of elements to define a new group. Once a group is defined (conveniently by the user) the method receives metadata that reflects relationships between repeating instances of different elements. For example, assume that during stage 120 multiple search result web pages are received. A typical search result web page includes search results, each including a title with a link to the search result and a summary of the page linked. After defining two fields: "title" and "summary", the user can define a group named "search result" that will facilitate an association of the first result title with the first result summary, the second result title with the second result summary, and so on, allowing an equivalency engine to return results in an hierarchically structured format. Optionally, the user can also define more complex hierarchies such as groups inside groups and groups that contain both groups and fields. Once the user has finished defining the fields and groups, she can give the web feed a name and additional meta-data such as tags and description, save it and start using it.

Stage 200 is also followed by stage 250 of processing received metadata. The metadata (and semantic information) relates to the selected element and to equivalent elements. The metadata can relate to elected equivalent elements.

Stage 250 includes mapping between names included in received metadata and technical information necessary to extract relevant content from any instance of similar pages on the website. It can also include creating an XML representation of the feed to be created. The web feed data structure can include information relating to web feeds generated by users as well as information that associate between related web feeds. Web feeds can be related to each other if they associated with similar metadata (especially similar semantic metadata). Similarity between web feeds can be learnt from the identity of users that subscribed and/or defined the web feeds. If certain users subscribed to certain web feeds they can be associated to each other. Statistics relating to the subscription to web feeds, timing between subscription to different web feeds, identity of users that subscribed to different web feeds, unsubscribing from web feeds, and/or metadata that links the web feeds to each other can provide an indication about the association level between different web feeds.

The web feed data structure or at least portion thereof (especially semantic information relating to web feeds) can be exposed to multiple users. Conveniently the web feed can become readily available for users of the system. The individual contributions of each user can construct a web feed data structure that enables a significant (even full) coverage of the web in the form of semantic understanding and programmatic interaction with websites.

Conveniently, stage 250 is followed by stage 270 of creating the appropriate a web feed format. The user can select the type of feed requested and the system creates the web feed from the internal XML.

Conveniently, method 200 includes stage 290 of automatically creating web feeds and, additionally or alternatively modifying existing web feeds. Stage 290 can include examining similarities between web pages, based upon the content of the web feed data structure. For example if after running the standard key generating algorithms another web site has the same set of keys (or similar keys based on some heuristic), the system can use the same selections and semantic information provided by the user for the original web site.

Conveniently method 200 includes stage 295 of searching web pages based upon semantic information (or other metadata) associated with these web feeds (e.g. "find all web pages that include recipes with less than 200 calories.").

Conveniently method 200 includes stage 297 in which semantic understanding can be applied to advertising networks or affiliate networks that have an API. Website owners can use this semantic information to programmatically select between existing affiliate network feeds to choose both the most appropriate merchant and dynamically display the most appropriate merchant products for each page on their site. If the merchant or advertiser does not have an appropriate web feed, this invention can be used to easily create such a web feed.

According to other embodiments of the invention the system can be used to better match and target advertisements, or merchandise to content. Website owners can place the system semantic powered advertising that directly relates to an understanding of the content, as opposed to traditional methods of keyword matching (e.g. "provide a link to my supermarket checkout with a pre-filled shopping cart whenever a list of ingredients exists.")

After creating a web feed, the user may choose to edit the web feed or create a new web feed based on it. The process of editing a web feed is conveniently similar to the process of creating one, except for the fact that the user need not supply the pages to work on and the web feed is pre-defined.

FIG. 5 illustrates method 300 for distributing a web feed.

Stage 310 starts by stage 310 of determining to initiate a web feed distribution process or receiving a trigger that triggers a web feed distribution process.

Stage 310 is followed by stage 320 of retrieving information representative of a web feed, wherein the information includes at least one selected element.

Stage 320 is followed by stage 340 of searching for at least one new equivalent element; wherein a new equivalent is equivalent to the at least one selected element and is not included in the web feed. Stage 340 can include generating the newly retrieved web page and calculating equivalency classes, in a manner than is analogues to stage 120.

Stage 340 is followed by stage 350 if the new keys generated for the website are different, according to some metric, than the original keys—then the system will notify the user (either by email or otherwise) of the fact that their feed has degraded and may no longer work properly as described in stage 350.

Stage 340 is followed by stage 360 of generating an updated web feed that includes the at least one selected element and the at least one new equivalent element, if the at least one new equivalent element was found during stage 340.

Stage 360 is followed by stage 380 of syndicating the updated web feed.

FIG. 6 illustrates system 400 for generating and distributing web feeds.

System 400 can include various software, firmware, middleware and/or hardware components. It is typically connected to users via one or more networks.

System 400 may represent practically any type of computer, computer system or other programmable electronic device. System 400 may be connected in a network or may be a stand-alone device in the alternative. System 400 can be connected to other devices via wired and/or wireless links. It is noted that system 400 can be characterized by a centralized architecture but that it can also be characterized by a distributed architecture. Accordingly, the various components of system 400 can be located near each other, but this is not necessarily so.

System 400 includes memory unit 410, and processor 420. Memory unit 410 is adapted to store information representative of a web feed, wherein the information includes at least one selected element. Memory unit 410 can store the web feed data structure or portions thereof.

Processor 420 is adapted to search for at least one new equivalent element. A new equivalent is equivalent to at least one selected element that and is not included in the web feed. Processor 420 is also adapted to generate an updated web feed that includes the at least one selected element and the at least one new equivalent element; and to syndicate the updated web feed.

It is noted that system 400 can perform various stages of method 100 and, additionally or alternatively, can perform various stages of method 300.

Conveniently memory unit 410 is adapted to store selection information representative of a selection of selected elements out of multiple elements of a web content representation, and processor 420 is adapted to generate an equivalent indication representative of at least one equivalent element that is similar to the selected elements; wait for a user to elect at least one equivalent element; and define a web feed that comprises the selected element and at least one equivalent element, if at least one equivalent element exists.

FIG. 6 also illustrates various modules. These modules can be software modules that are executed by processor 420 but this is not necessarily so.

Equivalency engine 430 can calculate equivalency classes, can locate elements that are equivalent to selected elements, and the like.

Equivalency class modules A-C 442-446 are sample equivalency engines. Each includes information representative of mutually equivalent elements. These modules as well as additional modules (such as metadata module) can form a web feed data structure.

Runner module 450 scans web pages and sends elements of these web pages to the equivalency engine.

Figure 7:
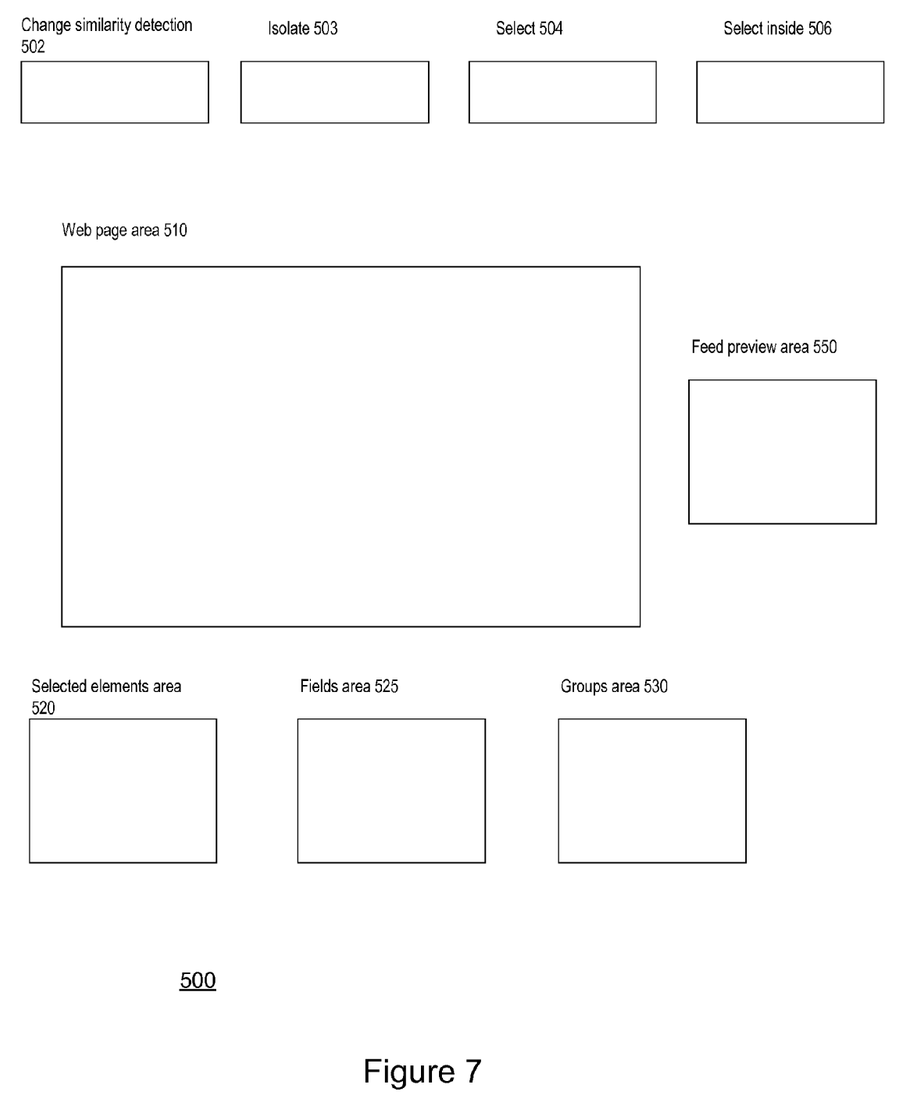
FIG. 7 illustrates a screen displayed to a user, according to an embodiment of the invention.

During the definition of a web feed multiple screens can be displayed to the user. FIG. 7 illustrates an illustrative sample screen 500 that is presented to a user during the definition of the web feed.

Screen 500 includes various control icons 502, 505 and 506, web page display area 510, selected element area 520 and group area 530. It is noted the screen is displayed after a user browses to the primary website and enters a URL or other information that represents a web site that is displayed (or one of its pages is displayed). It is noted that the user can also select the format of the web feed.

Web page display area 510 is used to display web pages, either in their original format or including highlighted elements that can represent a selected element and, additionally or alternatively, one or more equivalent elements.

Control icon "change similarity detection" 502 can be used to determine which equivalency algorithm is used and, additionally or alternatively, what is the equivalency level required to define two elements as equivalent items. Control icon "select" 505 allows a selection of a selected element. Control icon "select inside" 506 allows a display of a portion of an element. Selected element area 520 is used to display selected elements. Field area 525 is used to display the field names given to selected elements. Group area 530 is used to display groups and the elements included in the groups. It is noted that names or other attributes of elements and groups can be displayed within areas 520 and 530. It also contains an interactive feed preview area 550.

We claim:

1. A method for sharing a web feed, the method comprising:
   receiving at a processor of a computer system a user request to the computer system to view a predefined web feed that is promoted by a web site when browsing the web site, wherein the web site differs from a web feed search engine;
   at the processor of the computer system, searching at least one web feed repository stored at a memory unit of the computer system for a web feed set that comprises at least one web feed that is related to the web site or to the predefined web feed; and
   at the processor of the computer system, enabling a subscription to a web feed of the web feed set,
   wherein the at least one web feed is included in the web feed set if at least one of the following conditions is fulfilled:
      a URL of the web feed is associated with a URL of a page of the web site wherein the user is not subscribed to the feed associated with the web site;
      the web feed has a topic that is similar to a topic of the predefined web feed; and
      the web feed has a topic that is similar to a topic of the web site.

2. A computer program product of a computer readable medium usable with a programmable computer, the computer program product having computer readable code embodied therein for
   receiving at the computer a user request submitted to the computer to view a predefined web feed that is promoted by a web site when browsing the web site, wherein the web site differs from a web feed search engine;
   at the computer, searching at least one web feed repository stored at the computer for a web feed set that comprises at least one web feed that is related to the web site or to the predefined web feed; and
   at the computer, enabling a subscription to a web feed of the web feed set,
   wherein the at least one web feed is included in the web feed set if at least one of the following conditions is fulfilled:
      a URL of the web feed is associated with a URL of the web site wherein the user is not subscribed to the feed associated with the web site;
      the web feed has a topic that is similar to a topic of the predefined web feed; and
      the web feed has a topic that is similar to a topic of the web site.

3. A system for generating a feed, the system comprising:
   a memory unit adapted to store a web feed repository; and
   a processor, adapted to receive a user request to view a predefined web feed that is promoted by a web site when browsing the web site and further adapted to search the web feed repository for a web feed set that comprises at least one web feed that is related to the web site or to a predefined web feed promoted when browsing by the user to the web site; wherein the web site differs from a web feed search engine; wherein the system enables a subscription by the user to a web feed of the web feed set,
   wherein the at least one web feed is included in the web feed set if at least one of the following conditions is fulfilled:
      a URL of the web feed is associated with a URL of the web site wherein the user is not subscribed to the web feed associated with the web site;
      the web feed has a topic that is similar to a topic of the predefined web feed; and
      the web feed has a topic that is similar to a topic of the web site.

* * * * *